(12) United States Patent
Eccles et al.

(10) Patent No.: US 6,503,056 B2
(45) Date of Patent: Jan. 7, 2003

(54) HEATING DEVICE AND METHOD FOR DEPLOYABLE RAM AIR TURBINE

(75) Inventors: Steven R. Eccles, Torrance, CA (US); Wayne G. Schindler, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/841,996

(22) Filed: Apr. 24, 2001

(65) Prior Publication Data

US 2002/0154999 A1 Oct. 24, 2002

(51) Int. Cl.[7] ................................................ F01D 5/08
(52) U.S. Cl. ...................... 416/95; 416/142; 416/245 R
(58) Field of Search ...................... 416/95, 142, DIG. 4, 416/245 R; 244/134 D, 134 E, 134 R; 310/154.01, 154.02

(56) References Cited

U.S. PATENT DOCUMENTS

| 3,455,396 A | | 7/1969 | Cummings |
| 3,573,520 A | * | 4/1971 | Dorshimer .................. 310/168 |
| 4,556,366 A | * | 12/1985 | Sargisson et al. ........... 416/155 |
| 5,135,355 A | | 8/1992 | Colley et al. |
| 5,281,091 A | | 1/1994 | Dooley et al. |
| 5,545,009 A | | 8/1996 | Ke |
| 5,558,495 A | | 9/1996 | Parker et al. |
| 5,623,821 A | | 4/1997 | Bouiller et al. |
| 5,746,580 A | | 5/1998 | Parker et al. |
| 5,793,137 A | * | 8/1998 | Smith .......................... 310/114 |
| 6,127,758 A | | 10/2000 | Murry et al. |

* cited by examiner

Primary Examiner—Edward K. Look
Assistant Examiner—Ninh Nguyen
(74) Attorney, Agent, or Firm—William J. Zak, Jr., Esq.

(57) ABSTRACT

The heating apparatus and method for the nose fairing of a rotating blade assembly has an electrical generator connected to a heating element attached to the interior of the forward end of the nose fairing. The electrical generator has a rotor with conductor windings attached to the aft end of the rotating blade assembly hub housing. The stator of the electrical generator is attached opposite the rotor on the support structure for the hub housing with stator magnets spaced from and opposite the rotor windings. When the hub housing is rotated by for example airflow through the blades of the rotating blade assembly the rotor moves relative to the stator thereby creating an induced current in the windings. This converts the rotational energy to electrical energy to power the heater to heat the nose fairing to inhibit the formation of ice thereon.

18 Claims, 6 Drawing Sheets

HEATING DEVICE AND METHOD FOR DEPLOYABLE RAM AIR TURBINE

BACKGROUND OF THE INVENTION

This invention relates to heating of nose fairings for rotating blade assemblies as for example gas turbine engine intakes, rotating ram air turbines and the like. The new heating apparatus has an electrical generator incorporated into the rotating blade assembly and the support structure thereof that provides electrical energy to a heating element mounted in the forward portion of the nose cone or fairing.

Ram air turbines (RATs) can be used in commercial aviation as emergency power systems. They typically will have a turbine with a rotating hub and a plurality of blades. The front of the turbine hub (i.e., nose cone) can be prone to ice build-up. Problems arise if the ice breaks loose, hits, and then damages any down stream aircraft features, particularly engine inlets.

There are various means for heating, for purposes of deicing, the nose fairing of a rotating hub of an airfoil blade assembly. The heating may either maintain a temperature above the freezing point of water or may be engaged when ice forms on the nose cone to deice the structure.

An example of an apparatus for heat generation in the nose cone of a ram air turbine is disclosed in U.S. Pat. Nos. 5,558,495 and 5,746,580, issued Sep. 24, 1996 and May 5, 1998 respectively. In this invention electromagnetic induction is used to create heat between two relatively rotating components. In one embodiment a rotating nose cone is formed from electrically conductive material and a relatively fixed assembly of permanent magnet pole pieces positioned to interact with the nose cone material. The relative motion of the elements causes a change in magnetic flux to create heating in the nose cone material to prevent icing or for deicing. Some disadvantages to this design include the fact that additional elements such as bearings, shafts and the like must be incorporated into the existing ram air turbine structure. These additions, particularly the added bearings and shafts, increase the shaft rotational complexity that lowers the reliability of the system.

A further example of a deicing apparatus is found in U.S. Pat. No. 5,623,821. In this instance a rather complicated microwave system is incorporated in the blade and support assembly of an air intake device. The system is designed to deice the blades and nose cone of the air intake device. This system for deicing requires the incorporation of wave guide elements and microwave generators to generate and control the use of the microwave energy. Disadvantages with this system are the requirement for a significant redesign or change in structure of many of the elements of a turbine fan or air intake system to incorporate the structure necessary to distribute the microwave energy. This is principally the need for wave guide structure. The design of such a structure incurs added complexity when related to rotating blade assemblies as with RATs.

As can be seen, there is a need for a simple efficient apparatus and method to heat the nose fairing or nose cone of rotating blade assemblies.

SUMMARY OF THE INVENTION

An improved heating apparatus for nose fairings of rotating blade assemblies according to the present invention comprises an electrical generator connected to a heating element mounted in the forward portion of the nose fairing. In the preferred embodiment the rotor element of the generator is incorporated into the rotating blade hub assembly to facilitate electrical connection to the heating element. The stator element is incorporated into the fixed support structure of the rotating blade hub assembly. The electrical energy created by the rotational energy is used to power the heating element.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
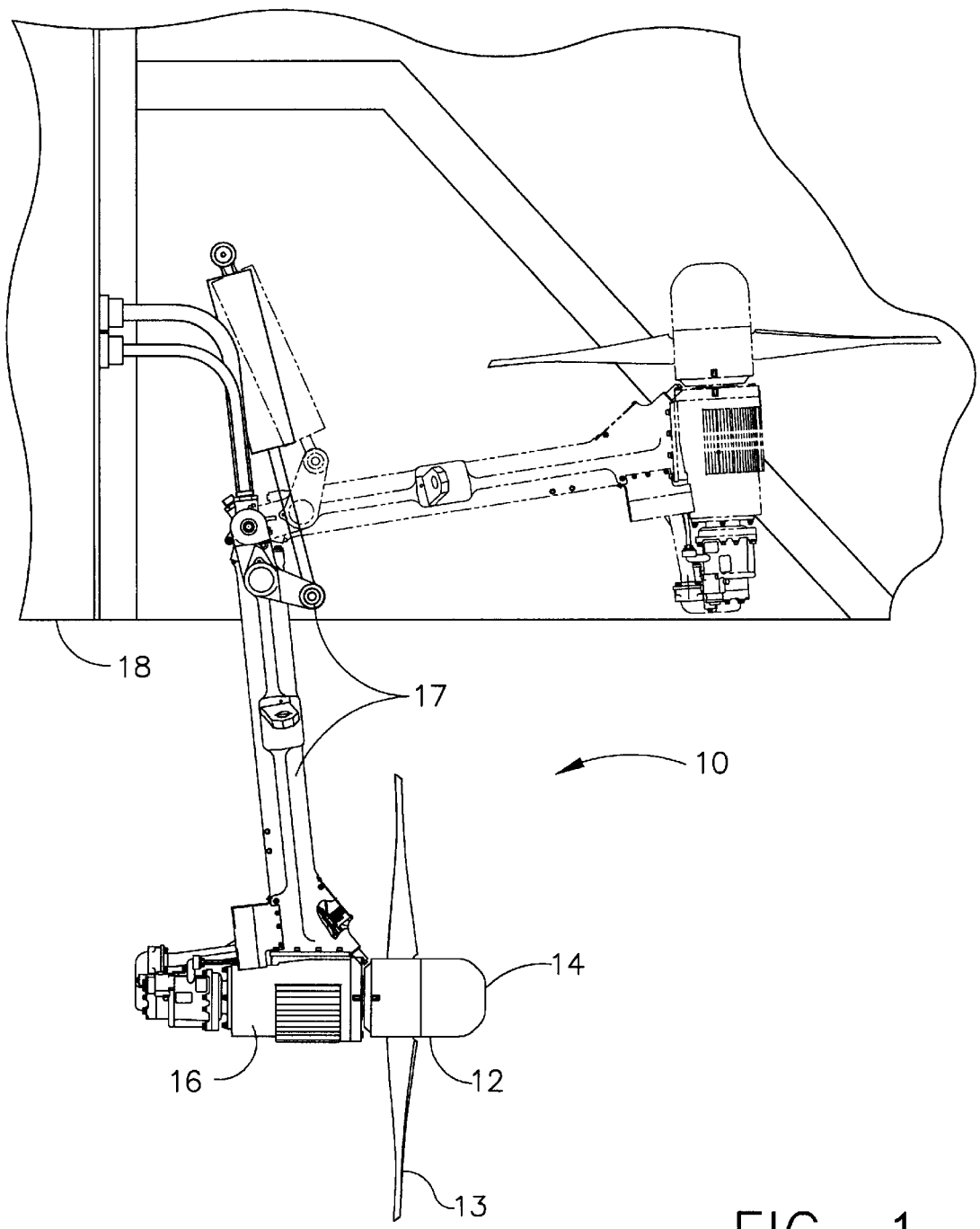
FIG. 1 illustrates a side elevation view of a deployable ram air turbine with support structure for aircraft use that can be implemented with the present invention.
Figure 2:
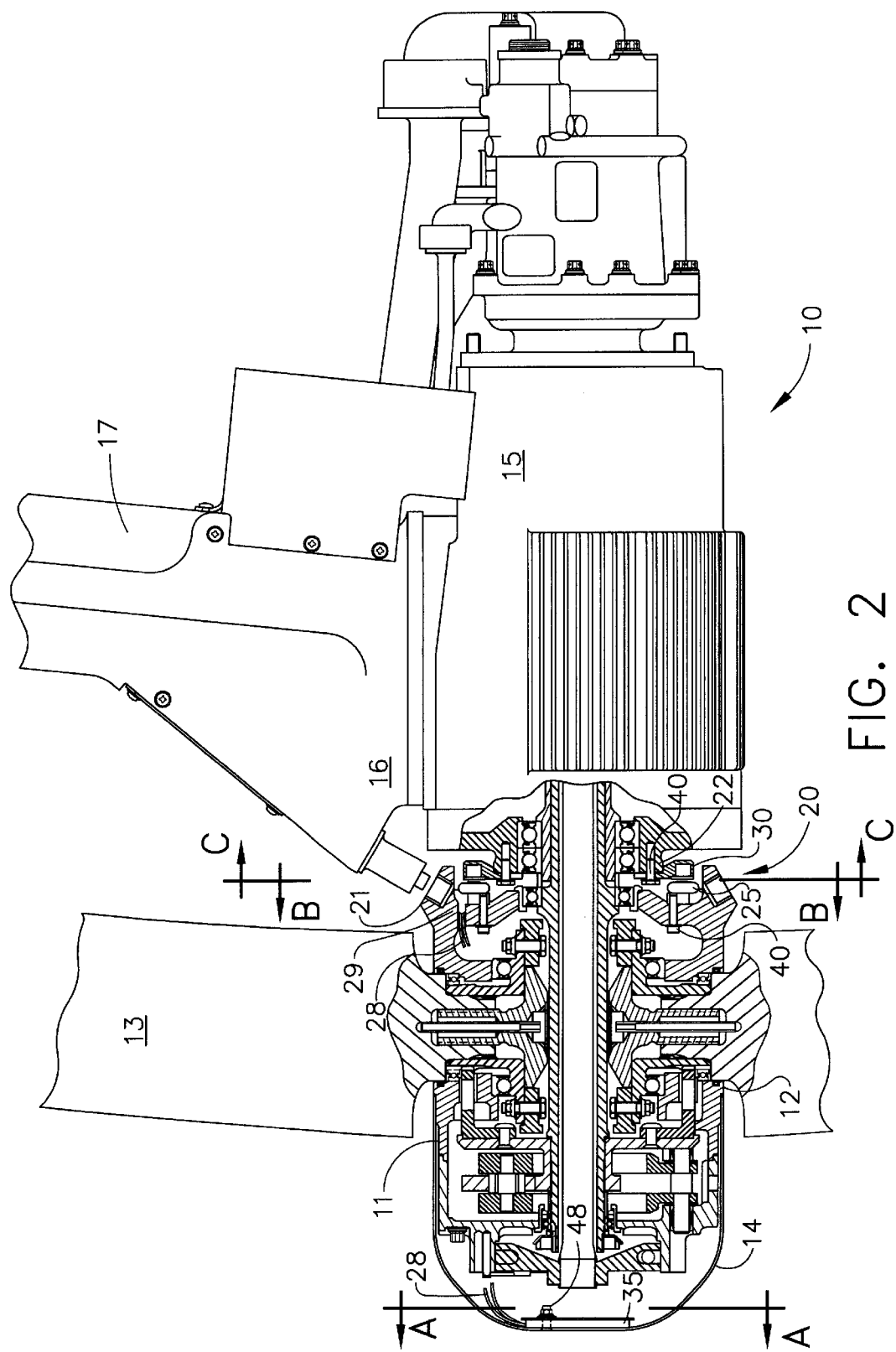
FIG. 2 illustrates a side elevation cross-section view of the ram air turbine with the heating apparatus according to an embodiment of the present invention.
Figure 2A:
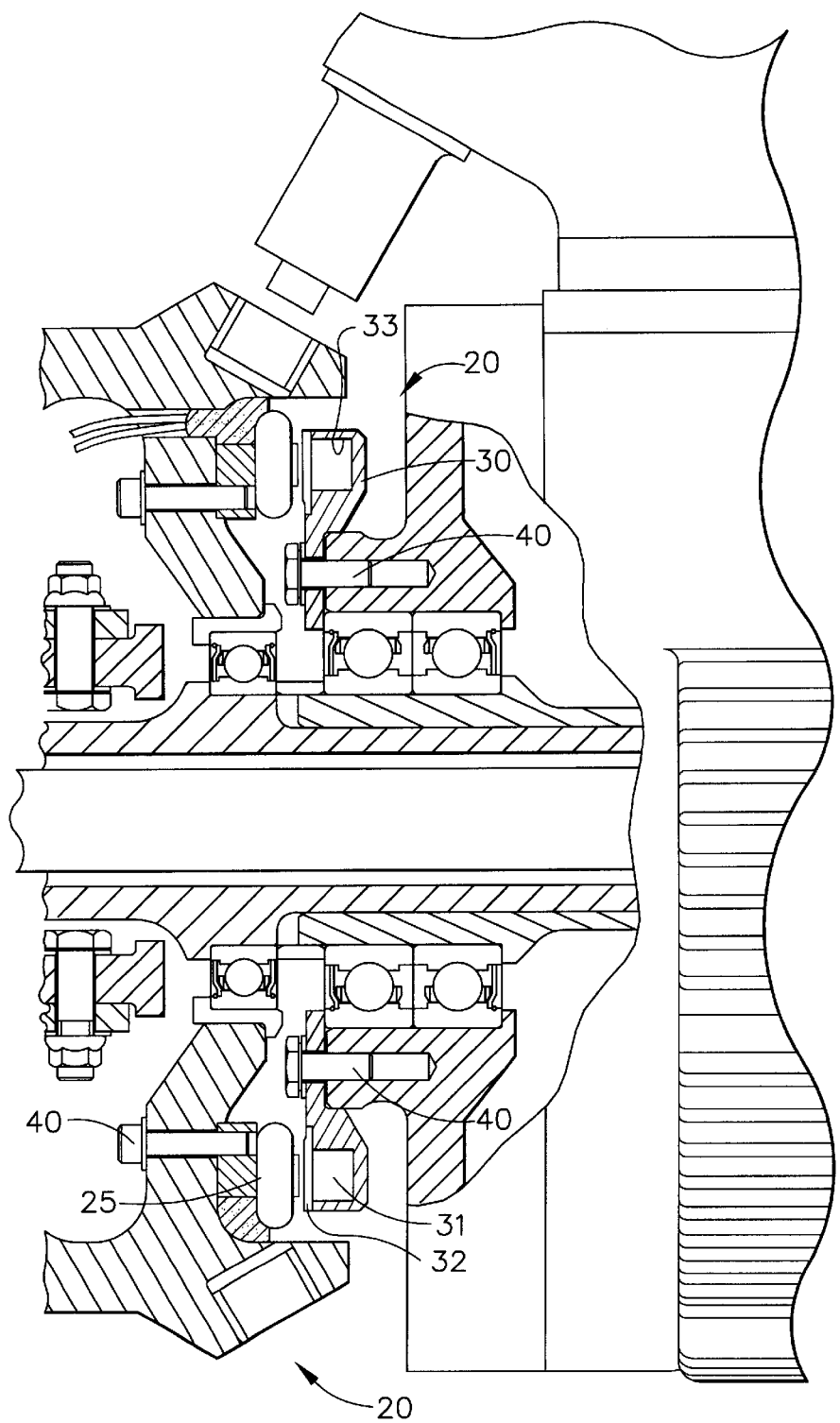
FIG. 2A illustrates a partial sectional view of the ram air turbine with the electrical generator.
Figure 3:
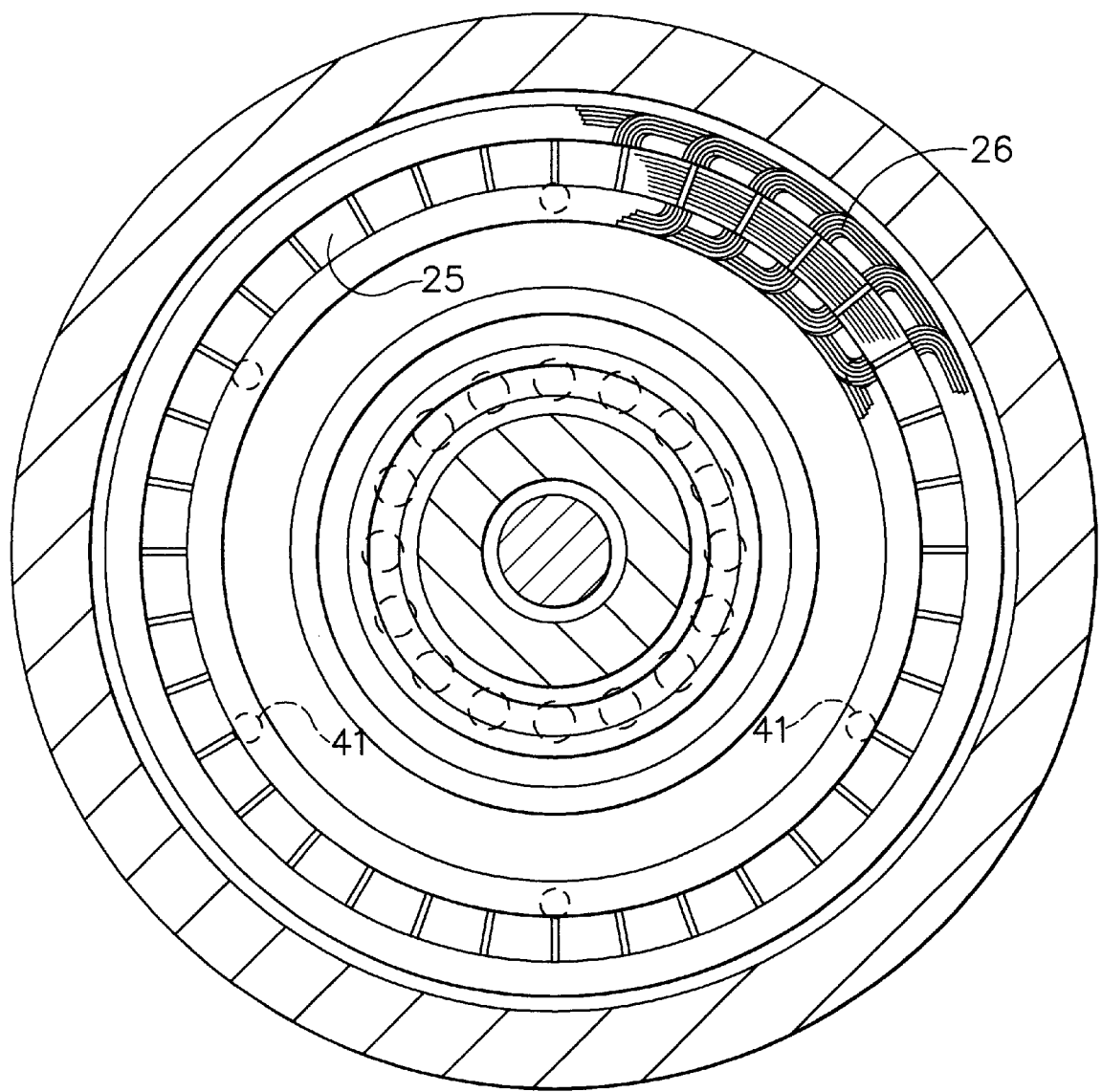
FIG. 3 illustrates a plan view of the rotor taken across line B—B of FIG. 2.
Figure 4:
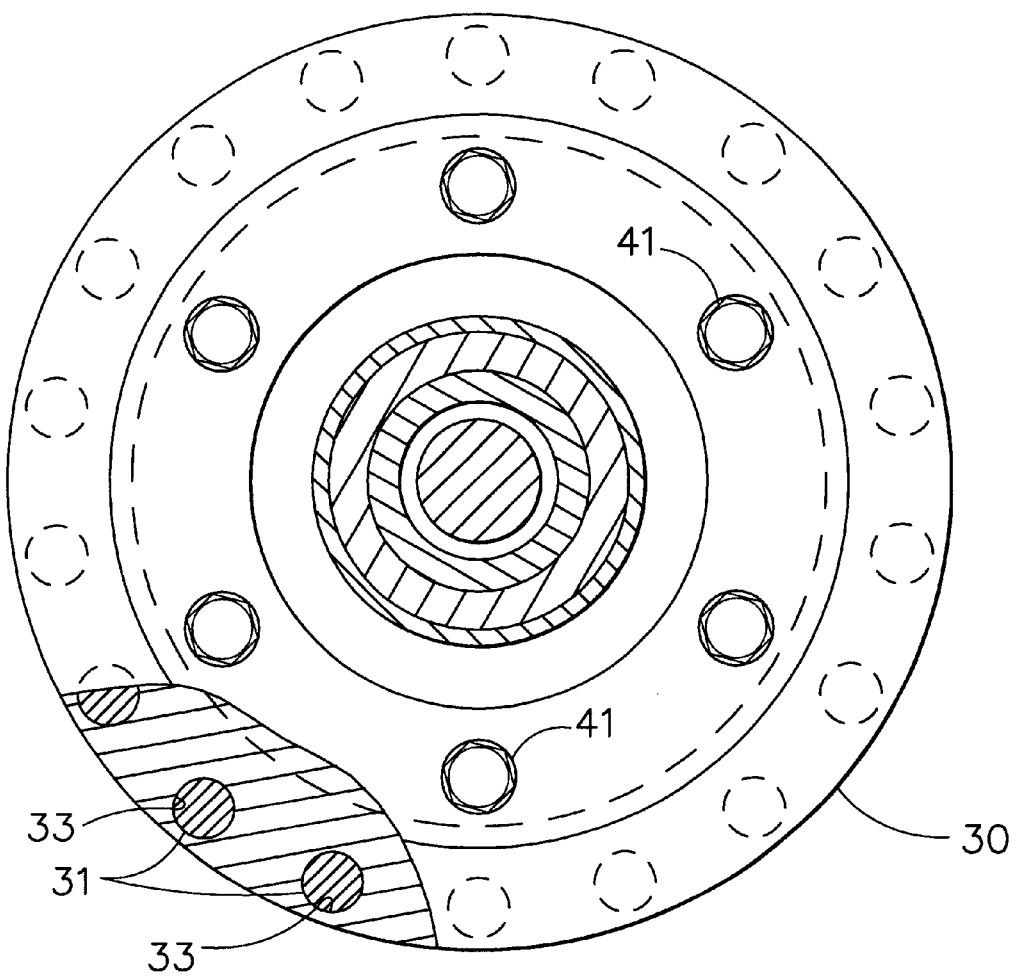
FIG. 4 illustrates a plan view of the stator taken across line C—C of FIG. 2.
Figure 5:
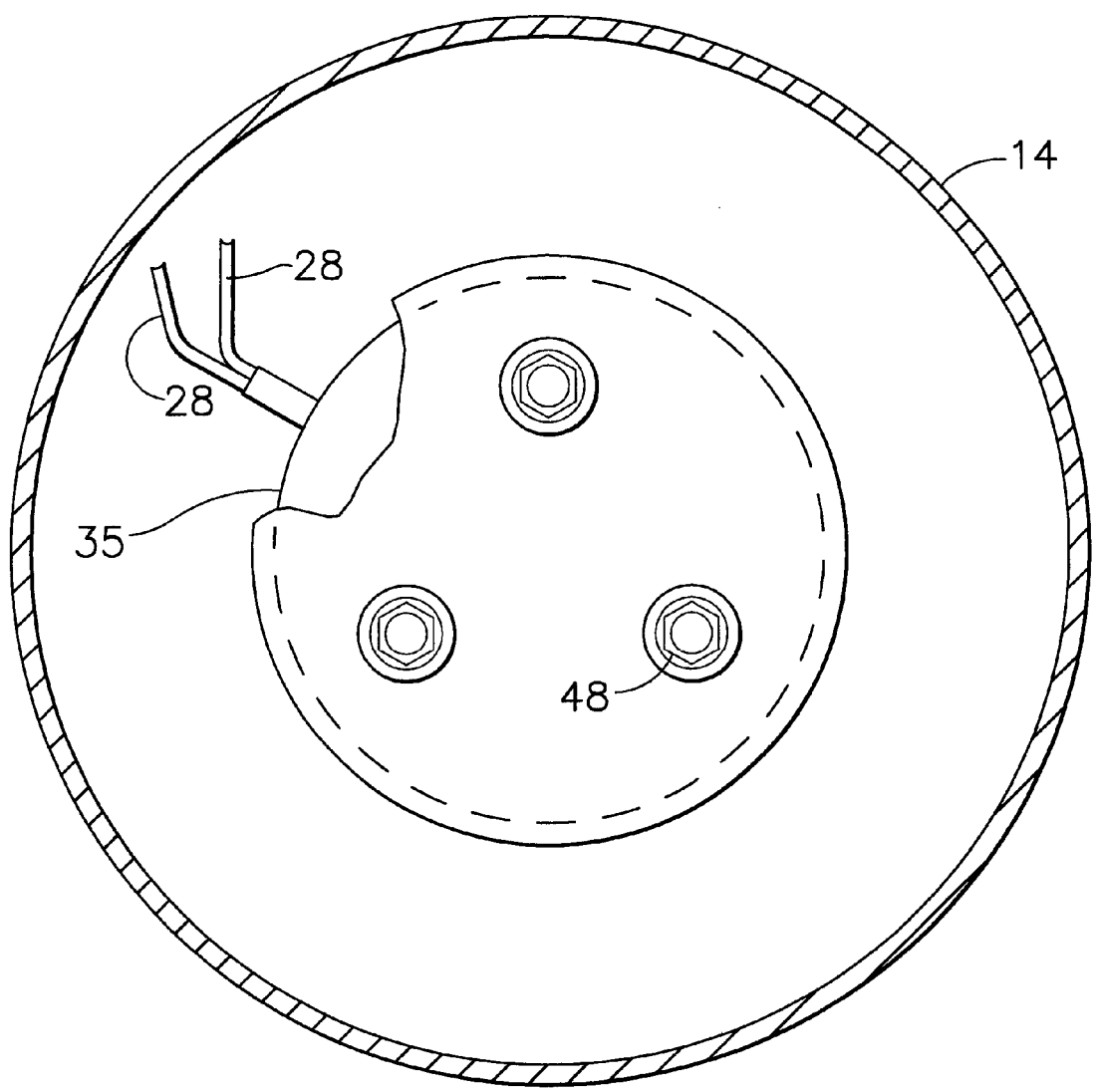
FIG. 5 illustrates a plan view of the heating element taken across line A—A of FIG. 2.

Referring to FIGS. 1 and 2, a ram air turbine 10, such as a deployable ram air turbine, as commonly understood for use in providing emergency power for aircraft is presented. This turbine 10 will be used to illustrate a preferred embodiment of the invention, although other rotating blade assembly structures may also incorporate the disclosed heating apparatus, such as aircraft propellers, turbofans and the like. The ram air turbine 10 has a rotating blade assembly 12 with blades 13 and nose cone or fairing 14, and power generator 15. The power generator 15 and support structure 16 are attached to the aircraft 18 by the strut mechanism 17.

An electrical generator 20 may have a generator rotor 25 attached at an aft end 21 of the turbine hub housing 11. A generator stator 30 may be attached at a forward end 22 of the support structure 16. The rotor 25 may be connected by cable harness 28 to a heating element 35. The heating element 35 may comprise a blanket heater, a channeled wire heating structure or other like electrical heater components, as an example. The generator 20 is illustrated with an axial gap between the stator 30 and rotor 25; however, other configurations are possible such as modifications for a radial gap.

Referring to FIGS. 2 through 5, the rotor 25 of generally annular shape can have conductor windings 26 incorporated and connected to cable harness 28. The cable harness 28 may be routed first through hole 29 and then traversed through hub housing 11 for connection to the heating element 35 mounted in the forward end of the nose cone 14. Positioning the rotor 25 and heating element 35 in this manner avoids the need to route the cable harness 28 through any relative rotating elements that would complicate the installation with the requirement for the electrical connecting means to transition a rotational interface. The hole 29 is sealed by, for example, a grommet or potting material in order to seal the hub housing from contaminates, and to secure the cable harness 28 in hole 29.

The stator 30 of generally annular shape may have a plurality of permanent magnets 31 attached to the forward surface 32 thereof. The stator 30 is attached to the forward end 22 of the support structure 16 with the magnets 31 positioned opposite the rotor 25. An axial air gap exists between the rotor 25 and stator 30. The stator 30 may have its forward surface 32 milled to create recesses 33 into which magnets 31 are inserted and attached thereto. The stator 30 and rotor 25 are illustrated as fastened to the structure by bolts 40 inserted through bolt holes 41.

The heating element 35 of generally circular shape is connected to cable harness 28. The heating element 35 may be fastened to the surface of nose cone 14 by bolts 48.

As installed in the representative ram air turbine 10, the electrical generator 20 converts into electrical energy the rotational energy of the hub housing 11 that rotates relative to the support structure 16. Rotation of the hub housing 11 with the attached rotor 25 element of the generator 20 causes motion relative to the stator 30. This motion induces electric current in the rotor 25 that is then conducted to a heating element 35 in nose cone 14. The elevation in temperature of the nose cone 14 prevents icing as well as deices.

It should be understood, of course, that the foregoing relates to preferred embodiments of the invention and that modifications may be made without departing from the spirit and scope of the invention as set forth in the following claims.

We claim:

1. In an apparatus for heating a nose fairing of a rotating blade assembly which comprises said nose faring which has a forward portion and which comprises a rotatable hub housing which extends from said nose faring to aft end and which comprises a support structure having a forward end for supporting said hub housing wherein the improvement comprises:

a rotor having an electrical conductor wound thereon, said rotor being attached at said aft end of said rotatable hub housing;

a stator having a forward portion having a magnet attached thereto, said stator being attached to said support structure forward end and wherein said magnet is positioned opposed to said rotor and spaced apart therefrom but in proximity for, in operation, generating electrical energy;

a heating element which is attached to said nose faring forward portion; and a cable harness which extends between cable harness first and second ends which connect said rotor conductor and said heating element for providing electrical communication between said rotor conductor and said heating element and wherein said aft end of said hub housing further comprises being configured with a hole therein which is configured and positioned so that said cable harness passes through said hole and so that said cable harness traverses said hub housing so that said cable harness is not routed through relatively rotating parts and so that said cable harness first end is attached to said heating element so that said cable harness second end is attached to said conductor of said rotor.

2. The apparatus of claim 1, further comprising a sealing material positioned in said hole with said cable harness to seal said hole.

3. The apparatus of claim 1, wherein said stator forward portion is configured with a plurality of recesses formed therein and further comprises a plurality of said magnets inserted in said recesses and attached thereto.

4. The apparatus of claim 1, wherein said rotor and said stator are spaced apart in an axial direction.

5. The apparatus of claim 1, wherein said rotor and said stator are spaced apart in a radial direction.

6. The apparatus of claim 1, wherein said rotating blade assembly is a ram air turbine (RAT).

7. A method for providing, in a rotating blade assembly, a heated rotatable nose fairing, comprising the steps of:

positioning a generator rotor in a rotatable hub housing located in spaced proximity to a generator stator in a non-rotating support so that said hub is rotatable relative to said support structure;

positioning a heater element internal to the nose fairing; and providing electrical communication between the generator rotor and the heating element.

8. The method of claim 7, wherein, in operation, an air flow through said rotating blade assembly causes rotation of the hub assembly.

9. The method of claim 7, wherein said rotor and stator are spaced apart in an axial direction.

10. The method of claim 7, wherein said rotor and stator are spaced apart in a radial direction.

11. The method of claim 7, wherein said rotating blade assembly is a ram air turbine (RAT).

12. A method for providing, in a ram air turbine (RAT) rotating blade assembly, a heated rotatable nose fairing, comprising the steps of:

positioning a generator rotor in a rotatable hub housing located in spaced proximity to a generator stator in a non-rotating support so that said hub is rotatable relative to said support structure;

positioning a heater element internal to the nose fairing; and providing electrical communication between the generator rotor and the heating element.

13. The method of claim 12, wherein, in operation, an air flow through said rotating blade assembly causes rotation of the hub assembly.

14. The method of claim 12, wherein said rotor and stator are spaced apart in an axial direction.

15. The method of claim 12, wherein said rotor and stator are spaced apart in a radial direction.

16. In an apparatus for heating a nose fairing of a ram air turbine (RAT) rotating blade assembly which comprises said nose faring which has a forward portion and which comprises a rotatable hub housing which extends from said nose faring to an aft end and which comprises a support structure having a forward end for supporting said hub housing wherein the improvement comprises:

a rotor having an electrical conductor wound thereon, said rotor being attached at said aft end of said rotatable hub housing;

a stator having a forward portion configured with a plurality of recesses formed therein and having a plurality of magnets inserted in said recesses and attached thereto, said stator being attached to said support structure forward end and wherein said magnets are positioned opposed to said rotor and spaced apart therefrom but in proximity for, in operation, generating electrical energy;

a heating element which is attached to said nose faring forward portion;

a cable harness which extends between cable harness first and second ends which connect said rotor conductor and said heating element for providing electrical communication between said rotor conductor and said heating element and wherein said aft end of said hub housing further comprises being configured with a hole therein which is configured and positioned so that said cable harness passes through said hole and so that said cable harness traverses said hub housing so that said cable harness is not routed through relatively rotating parts and so that said cable harness first end is attached to said heating element so that said cable harness second end is attached to said conductor of said rotor; and a sealing material positioned in said hole with said cable harness to seal said hole.

17. The apparatus of claim 16, wherein said rotor and stator are spaced apart in an axial direction.

18. The method of claim 16, wherein said rotor and stator are spaced apart in a radial direction.

* * * * *